Sept. 10, 1968    M. C. STAFFORD    3,400,603
TORQUE RESISTING SYSTEM
Filed Dec. 2, 1966    4 Sheets-Sheet 1

INVENTOR.
MILTON C. STAFFORD
BY
Paul + Paul
ATTORNEYS.

INVENTOR.
MILTON C. STAFFORD
BY
Paul + Paul
ATTORNEYS.

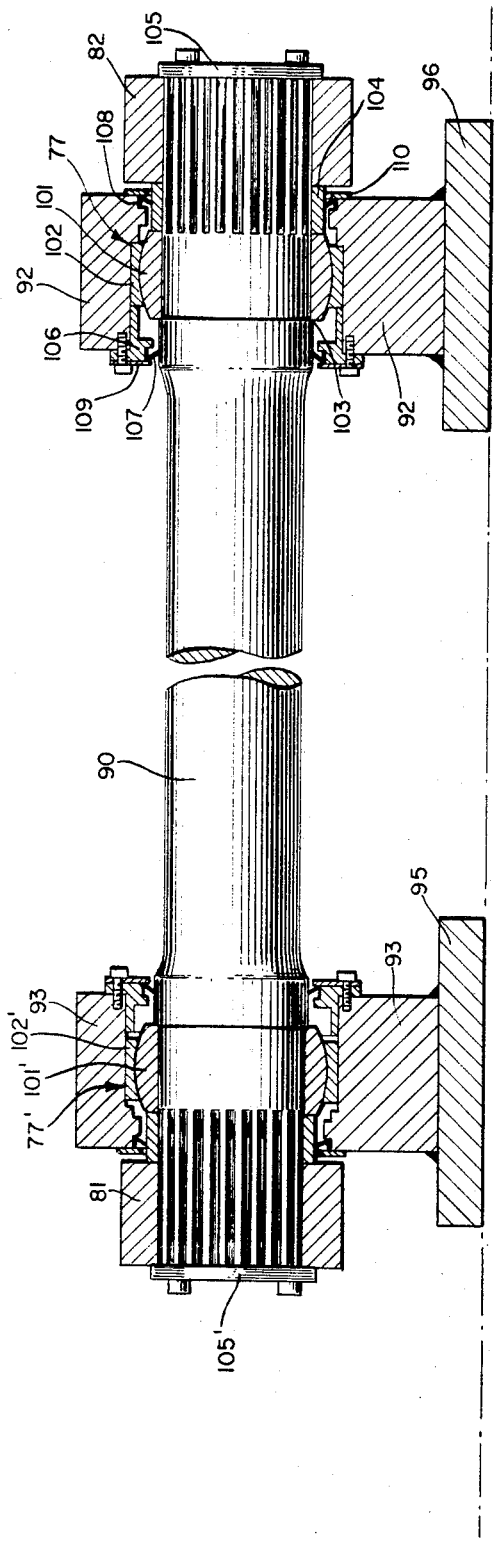
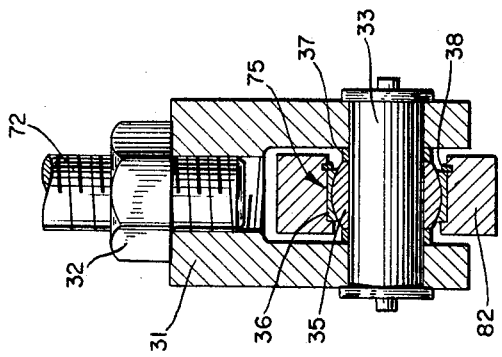
Fig. 5
Fig. 4
INVENTOR.
MILTON C. STAFFORD

United States Patent Office 3,400,603
Patented Sept. 10, 1968

3,400,603
TORQUE RESISTING SYSTEM
Milton C. Stafford, Valley Forge, Pa., assignor to King of Prussia Research and Development Corporation, King of Prussia, Pa., a corporation of Pennsylvania
Filed Dec. 2, 1966, Ser. No. 598,700
10 Claims. (Cl. 74—411)

ABSTRACT OF THE DISCLOSURE

A torque resisting system is disclosed for shaft mounted drives. A single torsion bar is horizontally disposed, preferably below the drive, and supported at each end in bearings for rotation. Crank arms are connected to each end of the torsion bar. The ends of the crank arms are connected by vertically disposed connecting rods to opposite sides of the main drive housing. Torque forces on the drive housing tend to pull one crank arm up and to push the other down, thereby causing opposite ends of the torsion bar to be subjected to torsional forces in opposing directions.

---

This invention relates to torque resisting or torque restraining systems.

While the torque restraining system of the present invention may be used for other purposes, it may be used to particular advantage in connection with shaft mounted drives used for tilting the refining vessels or crucibles in the refining of pig iron by the basic oxygen process. When so used, the torque resisting system of the present invention constitutes an improvement over prior art torque-resisting systems.

In a typical prior art system, a heavy refining furnace vessel, which is mounted on trunnions, is tilted by a bull gear which is fixed to one of the trunnions. The bull gear is driven rotationally by a plurality of pinions which are spaced about the periphery of the bull gear and which are driven by motors and speed-reducing gearing mounted in a drive housing which is mounted on and supported by the trunnion.

It is known in the prior art to restrain rotation of the drive housing by means of two opposed single-acting horizontally-disposed coaxially-disposed torque arms mounted directly below the trunnion shaft on which the drive housing is mounted. In such a system, assuming that appropriate provision is made for accommodating movement of the torque arms, then no force is exerted by the torque arms due to trunnion shaft wobble if the shaft-mounted drive is allowed to follow the trunnion shaft on which it is mounted. The only force exerted by the torque arms is due to torque.

In such an installation, if we assume a 250-ton furnace vessel, the maximum overload torque will be of the order of 6,000,000 foot pounds. The diameter of the main drive housing will be of the order of twelve feet, and, accordingly, the horizontally disposed torque arms would be attached to the drive housing at a point approximately six feet from the axis of rotation of the driven trunnion shaft. Thus, 1,000,000 pounds of force (6,000,000 divided by 6) will be required at the torque arm to resist the 6,000,000 foot pounds of torque. Since an equal and opposite force must be exerted on the drive to oppose the force of the torque arm, and since the only other point of contact with the drive is at the trunnion shaft, a radial force of 1,000,000 pounds is necessarily applied on the trunnion shaft and bearing by the drive.

In addition to the above load due to torque, the weight of the drive must also be supported by the trunnion shaft and bearing. The weight of the typical drive of the size now being discussed will be approximately 200,000 pounds. Thus, the total maximum force (excluding shock loads) that will be exerted on the trunnion shaft will be the vector sum of the above two forces, or a total of 1,020,000 pounds at an angle of 11.3° from the horizontal. Any torque due to shock load during deskulling, etc. or unexpected overloads, will add to this figure.

It follows from the above that in a typical case such as is described above, the anchor point for the horizontal torque arm must be designed to withstand a horizontal force of 1,000,000 pounds; the trunnion shaft must be designed to transmit a torque of 6,000,000 foot pounds with a radial load of 1,020,000 pounds; and the trunnion bearing and support must be designed for the load due to the vessel plus the 1,020,000 pounds due to the drive.

Consider now the torque restraining means of the patent to Kron et al., 3,151,502 when used in an installation of similar size to that described above. In the Kron et al. patent, two double-acting torque arms located 180° apart are employed. These torque arms are vertically disposed, one at each side of the main drive housing. With a main drive housing having a diameter of twelve feet, the radius for the torque arm attachment will be six feet, the same as in the example given above. However, an additional force will now be experienced due to shaft wobble. If it be assumed that each torque arm employs a spring having a spring constant of 150,000 pounds per inch, and that the maximum trunnion shaft wobble is plus or minus one-half inch, the worse condition will exist if the drive is raised one-half inch due to trunnion shaft movement. With a spring constant of 150,000 pounds per inch, a vertical down force will then be exerted on the drive by each torque arm of 75,000 pounds, or a total of 150,000 of vertical down force due to shaft wobble.

When the 6,000,000 foot pounds of torque is transmitted, a resisting force of 500,000 pounds (6,000,000 divided by (2 times 6)) is exerted by each torque arm to overcome the torque. If the shaft is displaced vertically upward one-half inch while transmitting this torque, one torque arm will be exerting a total of 575,000 pounds and the other torque arm a total of 425,000 pounds, since one force is vertically up and the other is vertically down. The unbalance is accordingly 150,000 pounds. Stated another way, with the two torque arms displaced 180° apart and equally spaced as shown in the Kron et al. Patent 3,151,502, no radial load is transmitted to the trunnion shaft due to torque. The only radial load transmitted to the trunnion shaft is due to trunnion shaft wobble. The maximum load on the trunnion shaft and bearing will then be 150,000 pounds plus the weight of the drive, assumed to be 200,000 pounds, or a total of 350,000 pounds. The trunnion shaft and bearing will not be subjected to additional loads due to shock or unexpected overload on the maximum radial loads.

Comparing the prior art systems of the two types referred to above, it will be seen that the prior art system first referred to above requires the supports to be designed for 1,000,000 pounds of horizontal force, whereas the Kron et al. system requires the torque arm supports to be designed for 575,000 of vertical force. In the Kron et al. system, the maximum radial load on the trunnion shaft and bearing is 350,000 vertically, whereas in the prior art system first referred to the maximum radial load on the trunnion shaft is 1,020,000 pounds.

The forces experienced by the torque restraining system first referred to can theoretically be reduced by placing the point of application as far below the trunnion shaft as possible. However, in order to reduce the total radial load for this system from the 1,020,000 pounds indicated above, to the 350,000 pounds indicated above for the Kron et al. system, the torque arm radius would have to be 20.9 feet from the center, or 14.9 feet beyond the periphery of the drive housing. Even if this were done, the system would still be subjected to additional loads due to shock and overload, whereas the two individual torque arm system of the Kron et al. patent would not be.

*The invention of the present application*

The invention of the present application provides a torque resisting system which has the advantages of the two individual torque arm system of the Kron et al. patent without the disadvantages of either of the prior art systems referred to above. The new system is designed around a single torsion bar preferably located in a horizontal position, preferably below the drive.

The invention will be clearly understood from the following description of some presently preferred forms of the invention illustrated in the drawings in which:

FIG. 4 is a view, in section, of one form of ball and socket connection which may be used at both the upper and lower ends of the connecting rods. The particular view in FIG. 4 is at the lower end of rod 72 as seen looking along the line IV—IV of FIG. 2;

FIG. 5 is a view, in section, as seen looking along the line V—V of FIG. 2, showing the manner in which the torsion bar is supported;

Figure 1:
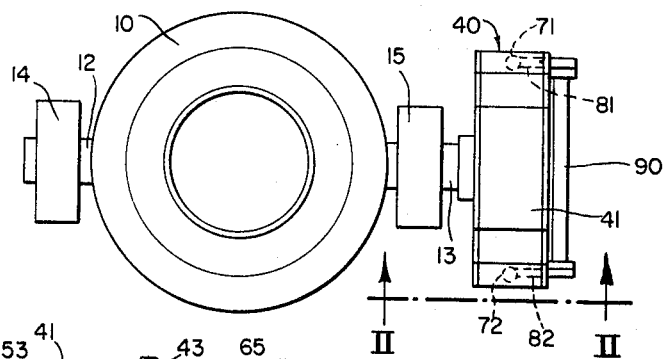
FIG. 1 is a schematic plan view of a trunnion-mounted refractory vessel showing the shaft-mounted motor-drive housing and torsion bar torque restraining means of the present invention.

Referring now to FIG. 1, this figure shows schematically, in plan view, a refractory vessel 10 mounted on trunnions 12 and 13 supported on pedestals 14 and 15 and tiltable about the axis of the trunnions 12 and 13 as by means of a power drive mounted on trunnion 13 and identified generally by the reference numeral 40. The power drive 40, in a typical case, includes a bull gear 52, a portion of which is visible in FIG. 3, and a plurality of pinions spaced about the periphery of the bull gear and driven by electric motors through suitable reduction gearing. The motors, reduction gearing and pinions are mounted in a housing 41 the rotation of which about the axis of trunnion 13 is prevented by the horizontal torsion bar 90 opposite ends of which are connected to opposite sides of the housing 41 through crank arms 81 and 82 and vertical connecting rods 71 and 72.

The structural details of how the power drive 40 is connected to the trunnion shaft 13 is not shown in the drawings of the present application, since the particulars of this connection forms no part of the subject matter being claimed herein.

To tilt the vessel 10, the bull gear 52 is driven rotationally by the group of pinions 53–56 spaced about the periphery of the bull gear 52. One of these, pinion 53, is visible in the broken-away portions of FIGS. 2 and 3. Three other pinions 54, 55 and 56 are indicated schematically in FIG. 3. The shaft 57 of pinion 53, which may be integral with the pinion, is driven by a motor 61 through suitable reduction gearing 65. In like manner, the pinion shafts of the other pinions 54, 55 and 56 are driven by motors 62, 63 and 64 through the reduction gearings 66, 67 and 68. The motors 61–64 and reduction gearings 65–68 are mounted on and supported by the main drive housing 41.

The main drive housing 41 may take any suitable form but is illustrated as a structure generally octagonal in vertical cross-section having a front wall 43 and a rear wall 44 between which the bull gear 52 is located and between which the pinion gears 53–56 are mounted. The front and rear walls, which are shown to be reinforced by radially directed ribs 45, are firmly connected together by connecting plates in order to maintain alignment of the multiple pinions supported by the wall and the driven bull gear. At its opposite sides, the generally octagonally-shaped housing 41 is provided with ears 46 and 47, which, as seen in cross section in FIG. 2, may be I-members welded to the sides of the main housing.

Secured to the under surfaces of ears 46 and 47 are depending legs 48 and 49, respectively, and pivotally connected to the legs 48 and 49, as by ball and socket assemblies 73 and 74, later described, are the upper ends of the vertically disposed connecting rods 71 and 72. The lower ends of the connecting rods 71 and 72 are connected by ball and socket assemblies 75 and 76, respectively, to crank arms 81 and 82, respectively. Each of the crank arms 81 and 82 extends in the same direction, and under no-load condition are substantially horizontal and parallel with the trunnion axis. In the illustrated embodiment, the torsion bar 90 is located forward of the housing 41 and, accordingly, the crank arms 81 and 82 extend forwardly from the lower ends of the connecting rods 71 and 72. However, in some installations it may be preferable to locate the torsion bar rearwardly of the housing 41, in which case the crank arms 81 and 82 will extend rearwardly from the lower ends of the connecting rods 71 and 72. In the description which follows the crank arms will be assumed to extend forwardly, as illustrated. At their forward ends, the crank arms 81 and 82 are connected by suitable means to the torsion bar 90. Preferably crank arms 81 and 82 are splined internally for receiving splined end portions of the horizontal laterally-disposed torsion bar 90. Torsion bar 90, which extends laterally across, below the housing 41, is supported at each end on the pedestals 92 and 93 on bases 96 and 95, respectively. Each end of the torsion bar 90 is supported in its pedestal in a self-aligning ball and socket bearing assembly.

The details of the particular ball and socket assemblies shown at opposite ends of the torsion bar 90 and at opposite ends of the vertical connecting rods are not of the essence of the present invention. The particular structural details of these parts, later to be described in detail, merely represent one satisfactory structural form. Before describing these structural details, it will be helpful to discuss generally the advantages of the torsion-bar torque restraining system as revealed by the brief description already given hereinabove.

It will be seen that the torsion bar 90 is located below the drive in a horizontal position and is supported near each end in bearings for rotation. It will also be seen that the crank arms 81 and 82 are connected to the torsion bar 90 near each end. Under no load condition, the two crank arms 81 and 82 lie in the same or substantially the same horizontal plane, parallel or approximately parallel to the axis of the trunnion 13. These crank arms extend in the same direction, from the lower ends of the connecting rods 71 and 72 to the opposite ends of the torsion bar 90. The two connecting rods 71 and 72 connect each crank arm to opposite sides of the main drive housing 41, at points equally spaced from the axis of rotation of the main drive.

Figure 3:
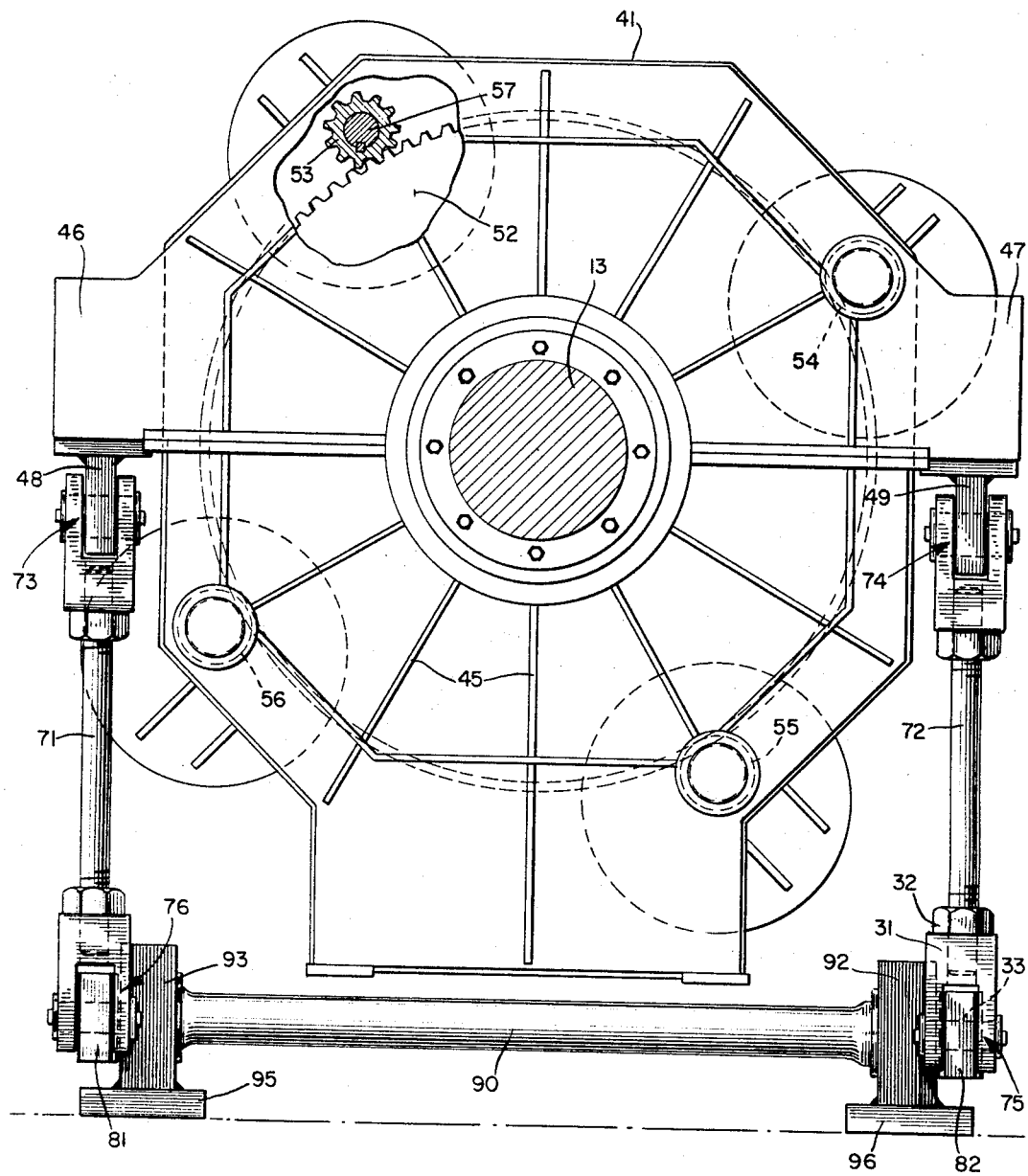
FIG. 3 is an elevational view looking axially forward along the line III—III of FIG. 2 in the direction of the arrows showing the motor-drive housing, the connecting rods on each side thereof, the horizontal torsion bar, and the crank arms which connect to the torsion bar.

When the main drive is power driven by the motors 61–64 to rotate the bull gear 52, for example, in the clockwise direction, as viewed in FIG. 3, the reaction force tends to move the motor drive and the housing 41 counterclockwise, and the torsion-bar torque restraining system of the present invention must prevent uncontrolled rotation of the motor drive and the housing which supports it. When the motor drive drives the bull gear 52 clockwise, as viewed in FIG. 3, and the motor drive and its housing react by trying to move counterclockwise, the force imposed on the connecting rod 72 on the right side of the housing will be upward, and the force imposed on the connecting rod 71 on the left side of the housing will be downward. As a result, the rearward or connecting-rod end of the crank arm 82 at the right side of the machine will be pulled upwardly, and the rearward or connecting-rod end of the crank arm 81 at the left side of the machine will be pushed downwardly. Since the crank arms 81 and 82 are splined to opposite ends of the same torsion bar 90, the torsional moment on the torsion bar due to the vertical upward force at one end of the torsion bar will be opposed by a torsional moment due to the vertical downward force at the opposite end of the torsion bar, and a torsional deflection will result in the torsion bar. The diameter and material of the torsion bar 90 is so selected that maximum torques will not exceed the fatigue limit of the torsion bar. As the torque being transmitted by the motor drive varies, the twist in the torsion bar varies, thus cushioning shock loads and the like.

It is to be noted that since the connecting rods 71 and 72 are connected to opposite ends of the same torsion bar through identical cranks, the vertical loads transmitted to the drive housing must be equal and will cancel each other. As a consequence, no load will be transferred to the main drive bearings, nor to the trunnion shaft 13, nor to the trunnion bearing, due to the torque being transmitted through the drive to tilt the heavy furnace vessel.

If, for any reason, the trunnion shaft 13 on which the drive is mounted moves vertically, for example, upward, the two connecting rods 71 and 72 will move vertically upward in unison, and the torsion bar 90 will be rotated slightly in its supporting bearings due to the upward movement of the crank arms 81 and 82. No torsional deflection will, however, result in the torsion bar 90 and, therefore, no load due to vertical movement of the drive will be transmitted to the drive bearings, trunnion shaft 13, or trunnion shaft bearings.

Any horizontal movement of the entire drive due to lateral movement of trunnion shaft 13 will be accommodated through the ball and socket connections at each end of the connecting rods 71 and 72. The maximum conceivable translating movement of the drive, due to trunnion shaft deflection, etc., is small with respect to the length of the connecting rods 71 and 72, and no significant change in the magnitude or direction of the load will result.

In summary, it will be noted that the torque-restraining torsion bar assembly illustrated in the drawings of the present application and described above will allow the drive to move with the trunnion shaft on which it is mounted without generating a load of any kind through the system. Second, it will cushion shock load generated anywhere in the system due to acceleration, deceleration, deskulling, scrap charging, etc. Third, it will prevent the drive from rotating when transmitting high torque loads without transmitting a radial load to the trunnion shaft or its supports. Fourth, the torsion bar assembly will not subject the main drive bearings, trunnion shafts, or trunnion bearings to any load other than the dead weight of the drive. Fifth, the space required by the torsion bar assembly is less than that required for the previous systems, hereinbefore referred to. Sixth, since no load is transmitted to the trunnion shaft, etc., due to trunnion shaft wobble, a higher spring constant can be used. The use of a high spring constant reduces rotational movement of the drive that must be accommodated, and more importantly it reduces the oscillation of the vessel while inching during the pour. Seventh, the single spring used, i.e. the torsion bar, is almost fully exposed for inspection at any time. And, lastly, since the new torque restraining system is of extreme simplicity, maintenance is reduced to an absolute minimum.

While the new torsion bar torque-restraining system is now fully understood by the reader, the structural details of the ball and socket assemblies shown in the drawings, and the manner of mounting the torsion bar illustrated in the drawings, will now be described in order to meet the requirements for a complete patent application. It is to be understood, however, that these structural details illustrate one presently preferred form and that modifications and changes may be made in these structural details without departing from the invention hereinafter claimed.

Figure 2:
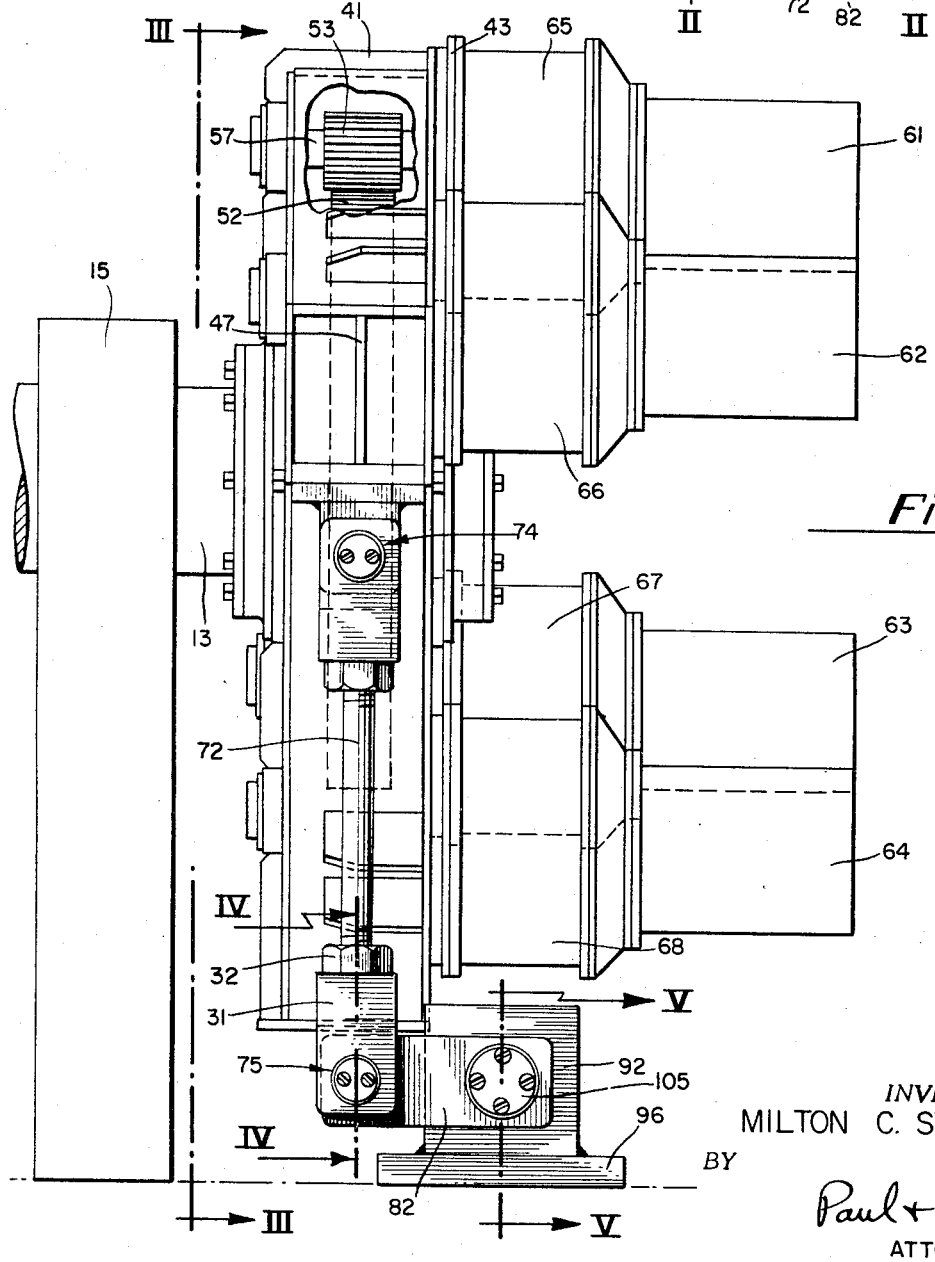
FIG. 2 is a side elevational illustration of the motor-drive housing showing the connections from the housing to the torsion bar.

Referring now to FIG. 4, this is a view in section looking along the line IV—IV of FIG. 2 and shows one form of ball and socket bearing assembly 75 which may be used at the joint connecting the lower end of the connecting rod 72 to the rearward end of the crank arm 82. In the form shown in FIG. 4, the lower end of connecting rod 72 has threaded thereon a bifurcated member or clevis 31 secured adjustably in place as by nut 32. The rearward end of the crank arm 82 is received between the legs of the clevis 31 and is pinned thereto by pin 33. Force fitted on pin 33, and held centered thereon by spacers 37, is a ball and socket assembly 75 consisting of the truncated ball 35 and the socket 36. The socket 36 of assembly 75 is held centered between a shoulder on the crank arm 82 and a retaining ring 38. The space between the legs of the clevis 31 is wider than the width of the crank arm 82, leaving space on either side of the crank arm so that the connecting rod 72 may move, to a limited extent, laterally relative to the trunnion axis, the clevis 31, pin 33, and ball 35 turning relative to the socket 36.

The ball and socket bearing assembly 76 on the other side of the machine, and the connection between the lower end of the connecting rod 71 and the crank arm 81 may be similar to that shown in FIG. 4 and just described hereinabove. Also, the ball and socket bearing assemblies 73 and 74, and the connections between the upper ends of the connecting rods 71 and 72 and the depending legs 48 and 49, may be similar to that shown in FIG. 4. Thus, as previously stated hereinabove, any horizontal movement of the entire drive due to trunnion shaft movement will be accommodated through the ball and socket connections at each end of the connecting rods, and since the maximum conceivable translating movement of the drive due to trunnion deflection, etc., is small, relative to the length of the connecting rods, no significant change in the magnitude or direction of the load will result.

Reference is now made to FIG. 5, which shows one way in which the torsion bar 90 may be mounted. As there shown, the two ends of torsion bar 90 are mounted in the pedestals 92 and 93 by means of self-aligning ball and socket bearing assemblies, identified as assembly 77 at the right end and assembly 77' at the left end. The self-aligning ball and socket bearing assemblies 77 and 77' at opposite ends of torsion bar 90 are correspondingly similar (except for one detail later to be mentioned) and accordingly similar reference numerals have been used to identify the parts. The reference numerals of the parts at the left end (FIG. 5) carry the prime designation. Since the two self-aligning assemblies are correspondingly similar, it will be necessary to describe but one of them. The right end assembly will be described.

In the form illustrated in FIG. 5, assembly 77 comprises the truncated ball 101 and the socket 102. The ball 101 is force fitted on to the torsion bar 90 and is held between a shoulder 103 and a spacer 104. The spacer 104 is held in place by the crank 82 which in turn is held on the splined end of the torsion bar 90 by the retaining plate 105. The socket 102 of the ball assembly 77 is held between a shoulder of the pedestal 92 and a retainer 106.

Oil seals 107 and 108 are held in place by the seal retainers 109 and 110, respectively.

As has already been indicated, the left end of the torsion bar 90, as viewed in FIG. 5, is supported on the pedestal 93 in a self-aligning ball and socket bearing assembly 77' which is correspondingly similar to assembly 77 at the right end, with one exception. In assembly 77, just described, the torsion bar 90 is axially restrained by the fact that the socket 102 is retained between retainer 106 and a shoulder of pedestal 92. In assembly 77' at the left end of the torsion bar, a space is provided on either side of the socket 102' so that torsion bar 90 may expand (or contract) under thermal conditions.

As previously indicated hereinbefore, the particular structural details illustrated in the drawings and described above with respect to the connecting bar and crank arm connections, and with respect to the mounting of the torsion bar, merely represent one suitable structure for connecting and mounting the torsion-bar torque-restraining system of the present invention. However, other suitable structures may be used, wtihout departing from the broad aspects of the present invention.

Figure 7:
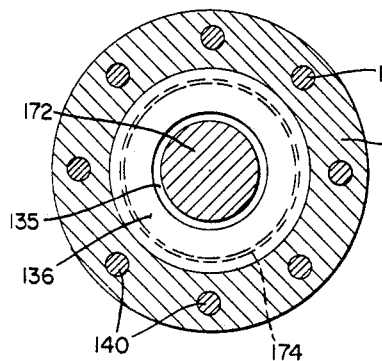
FIG. 7 is a view looking down along the line VII—VII of FIG. 6.
Figure 6:
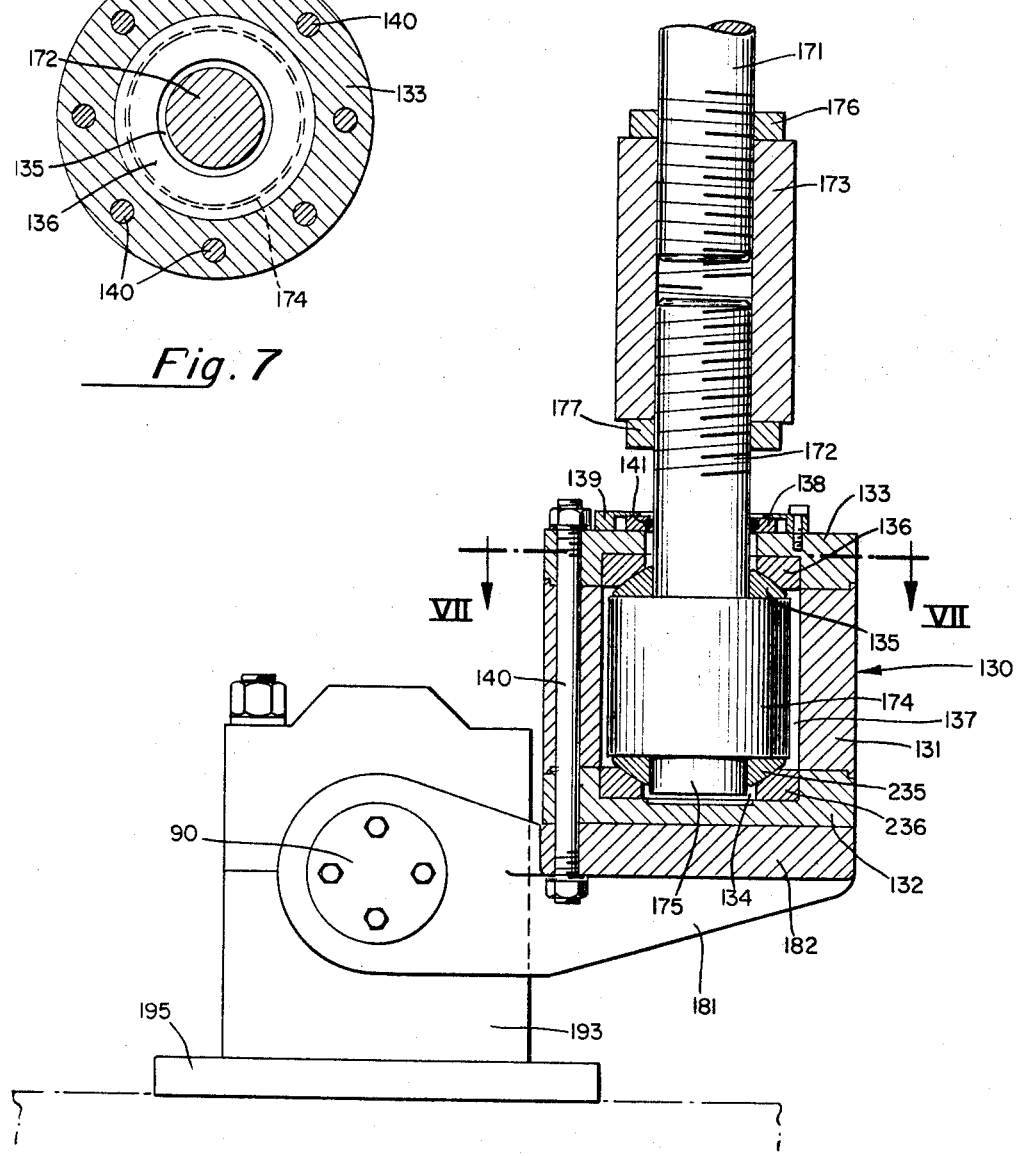
FIG. 6 is a view, in section, of another form of ball and socket connection which may be used at both the upper and lower ends of the connection rods. The particular view in FIG. 6 is at the lower end of one of the rods.

FIGS. 6 and 7 illustrate an alternate form of ball swivel or ball and socket bearing assembly which may be used in lieu of the type of ball and socket assembly illustrated in FIG. 4 and described previously hereinabove. In FIG. 6, the torsion bar 90 is shown to be supported in the pillow block or pedestal 193 on the base 195. The crank arm 181, which is splined or otherwise fixed to the end of the torsion bar 90, has a portion 182 which is circular in horizontal cross section and to which is bolted, as by 8 bolts 140 (FIG. 7), a housing 130 containing the ball and socket assembly. Housing 130 is shown to comprise a cylindrical wall 131, a bottom plate 132, and a top plate 133.

The ball and socket assembly supports for swivel movement a stud member having a reduced-diameter upper portion 172, an enlarged cylindrical portion 174, and a reduced-diameter lower portion 175 projecting below the enlarged portion 174. Force fitted on the stud portion 175 which projects below the enlarged portion 174 is an annular hardened steel ball segment 235 whose spherical convex surface is received by and supported in the spherical concave surface of an annular bronze socket segment 236 which is supported in the bottom plate 132 of the housing. Force fitted on stud portion 172 above the enlarged portion 174 is an annular hardened steel ball segment 135 whose spherical convex surface is received by the spherical concave surface of an annular bronze socket segment 136 held within the top plate 133 of the housing. Between the peripheral surface of the enlarged cylindrical stud portion 174 and the inner surface of the housing wall 131 is an annular chamber 137 providing clearance for swivel movement and receiving grease which may be injected into chamber 134 below the end of the portion 175. Surrounding the stud portion 172 above the top plate 133 is a sealing ring 141, a seal plate 138, and a retainer 139. Clearance for movement is provided between the stud portion 172 and the retainer 139. Clearance is, of course, also provided between the stud and the sockets 136, 236, and between the stud and the top plate 133.

The threaded upper end of the stud 172 receives a coupling 173 which is threaded oppositely at its upper end for receiving the oppositely threaded lower end of the connecting rod 171. The function of the coupling 173 is, of course, to provide for adjustment of the effective length of connecting rod 171 to position the crank 181 in a horizontal position under no-load or no-torque conditions. Lock nuts 176 and 177 prevent the connecting rod 171 and stud 172 from turning except during adjustment.

The form of swivel joint or ball and socket assembly shown in FIG. 6, may be used at the upper ends, as well as at the lower ends, of the connecting rods.

What is claimed is:

1. Torque restraining means for a shaft-mounted drive, said torque restraining means comprising: torsion spring means; means supporting said torsion spring means in a plane perpendicular to the axis of said shaft-mounted drive; lever arms connected to opposite ends of said torsion spring means; and means connecting said lever arms to opposite sides of said drive, whereby when said shaft-mounted drive tends to turn on said shaft, said lever arms apply torque in opposite directions to opposite ends of said torsion spring means.

2. Apparatus according to claim 1 characterized in that said torsion spring means is supported in a lateral position below the axis of said shaft.

3. Apparatus according to claim 2 characterized in that said torsion spring means is a torsion bar.

4. Apparatus according to claim 3 characterized in that said means supporting said torsion bar include self-aligning bearings at opposite ends of said torsion bar.

5. Apparatus according to claim 4 characterized in that the means connecting said lever arms to opposite sides of said drive include pivotal means.

6. Apparatus according to claim 5 characterized in that said means connecting said lever arms to opposite sides of said drive include a connecting rod on each side of the drive and a ball and socket bearing at each end of each connecting rod.

7. Apparatus according to claim 6 characterized in that means are provided for adjusting the effective length of each connecting rod.

8. Apparatus according to claim 2 characterized in that said means supporting said torsion spring means include self-aligning bearings at opposite ends of said torsion spring means.

9. Apparatus according to claim 8 characterized in that the means connecting said lever arms to opposite sides of said drive include pivotal means.

10. Apparatus according to claim 1 characterized in that said torsion spring means is a torsion bar.

References Cited

UNITED STATES PATENTS

| 3,167,975 | 2/1965 | Durand | 74—665 |
| 3,333,801 | 8/1967 | Falk | 74—665 X |

FRED C. MATTERN, JR., *Primary Examiner.*

LEONARD H. GERIN, *Assistant Examiner.*